United States Patent
Morlock (10) Patent No.: US 6,201,250 B1
(45) Date of Patent: Mar. 13, 2001

(54) SENSOR HOUSING FOR UV CURING CHAMBER

(76) Inventor: Richard C. Morlock, 1739 Ramapo Way, Scotch Plains, NJ (US) 07076

( * ) Notice: Subject to any disclaimer, the term of this patent is extended or adjusted under 35 U.S.C. 154(b) by 0 days.

(21) Appl. No.: 09/137,619

(22) Filed: Aug. 21, 1998

Related U.S. Application Data (60) Provisional application No. 60/067,474, filed on Dec. 1, 1997, and provisional application No. 60/056,834, filed on Aug. 22, 1997.

(51) Int. Cl.⁷ .................................................. G01J 1/18
(52) U.S. Cl. ................... 250/372; 250/339.12; 250/343; 250/492.1
(58) Field of Search .............................. 250/372, 339.12, 250/343, 492.1

(56) References Cited

U.S. PATENT DOCUMENTS

| | | | |
|---|---|---|---|
| 3,437,807 | 4/1969 | Moore | 250/372 |
| 3,562,520 | 2/1971 | Hippen | 250/43 |
| 3,858,048 | 12/1974 | Shand et al. | 250/373 |
| 3,973,328 | 8/1976 | Theobald | 34/4 |
| 3,984,726 | 10/1976 | Ramler | 315/107 |
| 4,015,340 | 4/1977 | Treleven | 34/4 |
| 4,032,817 | 6/1977 | Richmond | 315/149 |
| 4,165,463 | 8/1979 | Bowen | 250/372 |
| 4,591,724 * | 5/1986 | Fuse et al. | 250/492.1 |
| 4,621,187 | 11/1986 | Petro, Jr. | 219/358 |
| 4,629,896 | 12/1986 | Bridgen | 250/372 |
| 4,665,627 | 5/1987 | Wilde et al. | 34/4 |
| 4,742,231 | 5/1988 | Bridgen | 250/372 |
| 4,787,750 * | 11/1988 | Nelson et al. | 356/437 |
| 4,825,078 | 4/1989 | Huber et al. | 250/372 |
| 5,008,548 | 4/1991 | Gat | 250/372 |
| 5,057,348 | 10/1991 | Drain et al. | 428/76 |
| 5,117,562 | 6/1992 | Dulay et al. | 34/78 |
| 5,382,799 | 1/1995 | May | 250/372 |
| 5,408,458 | 4/1995 | Akiyama | 369/291 |
| 5,418,369 | 5/1995 | Moore et al. | 250/372 |
| 5,424,547 | 6/1995 | Stark et al. | 250/372 |
| 5,508,528 | 4/1996 | Mulkens et al. | 250/492.1 |
| 5,514,871 | 5/1996 | Hayes et al. | 250/372 |
| 5,539,210 | 7/1996 | Maarschalkerweerd | 250/372 |
| 5,751,008 | 5/1998 | Jung et al. | 250/504 R |

FOREIGN PATENT DOCUMENTS

| | | |
|---|---|---|
| 1 589 531 | 5/1981 | (GB) . |
| 6-186080 | 7/1994 | (JP) . |

\* cited by examiner

Primary Examiner—Constantine Hannaher
Assistant Examiner—Otilia Gabor
(74) Attorney, Agent, or Firm—Lerner, David, Littenberg, Krumholz & Mentlik, LLP (57) ABSTRACT

A sensor assembly for monitoring process parameters in an adverse environment is disclosed. The sensor is mounted on an exterior side of a chamber for curing polymeric materials using radiation. A shutter on the sensor assembly separates a passageway in which a sensor element is disposed from the adverse environment. A gas source pressurizes the passageway so that the passageway has a positive pressure when the shutter is in an open position as well as a closed position. A mounting device mounts the sensor assembly to an inerting tube of the curing chamber so that the sensor element will sense radiation inside the chamber when the sensor assembly is mounted outside the chamber.

25 Claims, 8 Drawing Sheets

TO PLENUM CHAMBER →

SENSOR HOUSING FOR UV CURING CHAMBER

CROSS REFERENCE TO RELATED APPLICATIONS

This application claims benefit of U.S. Provisional Application Ser. No. 60/056,834 filed Aug. 22, 1997 and Ser. No. 60/067,474 filed Dec. 01, 1997, the disclosures of which are hereby incorporated by reference herein.

BACKGROUND OF THE INVENTION

1. Field of the Invention

The present invention relates to the measurement of environmental parameters in an adverse environment and more specifically to the measurement of ultraviolet light ("UV") dosage in a chamber for UV curing of polymers.

2. Description of the Prior Art

UV curing is commonly used in the fabrication and finishing of polymeric products or components or products or components coated with polymeric materials. In the UV curing process, an uncured polymeric product or polymeric-coated product is carried through a curing chamber, past a UV curing lamp. For example, UV-cured products may include discrete parts, a web-like product, UV-cured inks and coatings, and filament-type products. The products may be carried on an open mesh belt or conveyor. Optical fiber is a filament-type polymeric product which may be cured in a UV curing process. In each of the examples, the UV radiation cures a polymeric compound to cross-link the composition in order to harden the compound, stabilize it, bind it to a substrate, or the like.

The ultraviolet radiation used in an ultraviolet curing process is provided by a high-intensity arc lamp enclosed in a quartz tube. The lamp is typically cylindrical and between four inches and four feet (about 10.2 cm to about 122 cm) in length. These lamps have power ratings of about 150 to 600 watts per inch (about 59.06 watts per cm to about 236.22 watts per cm). Reflectors are commonly used to concentrate radiation emitted by the lamps onto the product. Several types of reflectors are used in the industry. For example, an ultraviolet lamp is placed at the focus of a parabolic reflector to produce uniform ultraviolet light intensity over a given area for curing discrete parts or web material. This arrangement is also useful in sterilizing a bath of liquid such as water. An elliptically-shaped reflector may be used for focusing ultraviolet light on a single, high-intensity strip for curing web material.

In curing a filament-type material, two opposed elliptically-shaped reflectors arranged to form the shape of an ellipse may be used to cure the filament on all sides simultaneously. The lamp is located at one focus of the ellipse and the fiber travels through a transparent quartz inerting tube in the curing chamber at the other focus of the ellipse. Due to the shape of the ellipse formed by the opposed reflectors, the reflectors focus radiation from the lamp at one focus of the ellipse onto the fiber at the other focus, 360° around the fiber. In this way, the surface of the fiber facing away from the lamp receives radiation. The fiber is thereby cured on all sides simultaneously.

In all ultraviolet curing processes, it is critical to maintain a desired level or dose of radiation within a critical range in order to properly cure the material. An improper dose of radiation results in a defective product. For example, in curing ultraviolet curable ink, an excessive dose of radiation may cause cracking, discoloration or peeling, whereas an insufficient dose of radiation leaves the ultraviolet curable ink tacky, unstable, and improperly cured.

The dose of radiation is determined by the intensity of the ultraviolet light and the time of exposure of the material to the ultraviolet light. Several variables influence the intensity of ultraviolet radiation available within the chamber to cure the product. Two such variables are the performance of the ultraviolet lamp bulb and the reflectivity of the reflectors, each of which degrades over time. The useful operating life of the UV lamp is about 2,000 hours. Contamination in the curing process degrades components in the chamber and results from unlinked monomers and other vapors which are outgassed from the components and other materials in the curing chamber. Organic substances are deposited on the components in the chamber, including the ultraviolet lamp, the reflecting surfaces of the reflectors and the walls of the transparent inerting tube. Over time, the efficiency of the curing process is reduced. Although the exposure time for the product may be increased, by slowing the rate of the product passing through the chamber, the efficiency of the process is dramatically reduced and the cost of producing the ultraviolet cured product dramatically increased as a result of the contamination of the components. In addition, the degradation of the components may not be detected until a significant amount of product has emerged from the chamber in a defective state. Thus, detection of changes in these process variables is critical to assure the quality of an ultraviolet-cured product.

In order to maintain reasonably constant process parameters which within an ultraviolet curing chamber, as well as to detect problems in the process as they arise, the radiation intensity within the curing chamber is monitored. One method of monitoring ultraviolet intensity is to place a sensor on the conveyor which carries the product through the ultraviolet curing chamber. The sensor is thereby subjected to the same radiation as the product to be cured. A system utilizing this type of sensor is disclosed in U.S. Pat. No. 5,424,547 to Stark, et al. These sensors may also be positioned at the end of a glass rod or "light guide" that transmits ultraviolet light from the ultraviolet lamp to the sensor. However, it may be necessary to insert the light guide into the ultraviolet curing chamber during each measurement. Sensors used in these systems either contain sufficient circuitry to process and display the radiation data or the sensor is provided with sufficient memory to store the data for later processing and display by another device.

A sensor for measuring UV radiation within an inerting tube used in an optical fiber curing process is marketed by 4D Controls Ltd. under the name SOLATELL® Sola-Scope. That instrument comprises a hand-held stainless steel probe that may be inserted into an inerting tube. An exit iris at the end of the tube gathers UV data. The probe is manually rotatable in the inerting tube. No provision is made to index the probe to repeatable angular positions in the tube. The fiber curing process must be interrupted in order to take measurements.

The above systems require an operator to physically position the sensor and to take measurements and readings on a regularly scheduled bases. A typical manufacturing operation may include 20 or more UV curing chambers. In typical manufacturing operations involving numerous such ultraviolet curing chambers, the monitoring, recording and interpretation of measurement data at regular intervals may present significant difficulties.

A sensor permanently mounted to measure radiation in a UV chamber offers several distinct advantages. First, such a sensor need not be repositioned between readings; the repeatability of the sensor is thereby enhanced. Further, the taking of readings may be automated, assuring adequate monitoring of the process, and reducing the possibility that the process may be run with radiation levels outside the process limits.

A sensor may be permanently mounted in an ultraviolet chamber as disclosed in U.S. Pat. No. 4,665,627 to Wilde, et al. That patent describes a sensor mounted at one end of a tube extending into an ultraviolet chamber. The tube is aimed directly at the ultraviolet lamp and the sensor is mounted on the end of the tube outside the chamber. This system may automatically measure the output of the ultraviolet lamp at regular intervals and adjust the lamp intensity accordingly. Another type of sensor arrangement is disclosed by U.S. Pat. No. 5,418,369 to Moore, et al. for a UV curing system for curing optical fiber. This system uses an elliptical reflector and a quartz tube, as discussed above. The sensor senses the radiation through a series of holes in the reflector assembly.

In these systems, the sensor is subjected to the environment in the chamber by way of the sensor tube or holes in the reflector and therefore are exposed to contamination from the curing chamber. The sensor, like the other components in the system, degrades in accuracy as outgassed organic matter is deposited on the sensor or on a protective lens on the sensor. In addition, the ultra-violet radiation within a UV curing chamber can be as high as 200 times that of the sun. It would be desirable to protect the sensor from any unnecessary exposure to radiation. Thus, although some advancement has been made in monitoring and controlling process parameters in ultraviolet curing processes, there is room for significant improvement.

SUMMARY OF THE INVENTION

The present invention improves upon apparatus for curing polymeric materials and assemblies for monitoring radiation in curing apparatus. One aspect of the present invention is an apparatus for curing a polymeric material which includes a chamber wall defining a chamber, a source of radiation for providing radiation mounted within the chamber for curing a polymeric material and a reflector assembly mounted within the chamber for reflecting the radiation from the source to the material within the chamber. A sensor assembly for sensing the radiation within the apparatus has a housing including a passageway having at least one gas inlet and an open end through which radiation can enter. A sensor element is disposed in the passageway for sensing the radiation so that the curing of the material may be controlled. A shutter has an open position in which radiation can enter the passageway at the open end and a closed position in which the open end is blocked to prevent the radiation from entering the passageway. A gas source in communication with the at least one gas source inlet supplies gas to the passageway so that the passageway has a positive pressure when the shutter is in its open position as well as when the shutter is in its closed position. The positive pressure is sufficient to substantially reduce the entry of contaminants from the adverse environment of the chamber into the housing of the sensor assembly.

With contamination substantially reduced, the useful life of the sensor is dramatically improved and the radiation is sensed much more accurately. As a result of improved sensor accuracy, the parameters of curing the polymeric material are controlled and maintained with greater accuracy within the critical range required for curing. For example, as the radiation level drops due to lamp aging or buildup of contaminants within the components of the chamber, the rate the product moves through the chamber may be reduced so that the product receives a radiation dosage (intensity of radiation multiplied by time) which is within the desired range. In contrast, a less accurate sensor assembly may fail to indicate a change in radiation reaching the material to be cured. The material may receive an insufficient dosage and emerge from the chamber in a defective and insufficiently cured state.

The curing apparatus of the invention may be used to cure a coating of polymeric material on a fiber, such as an optical fiber, for example. The reflector assembly used in such a curing apparatus has an elliptical shape in plan with a first focus and a second focus. The source of radiation is mounted within the chamber at the first focus of the reflector assembly. The chamber in this system includes an inerting tube at the second focus, the inerting tube having a longitudinal axis and defining a conduit for a fiber having a polymeric coating to be cured. The fiber has a path of travel through the inerting tube at the second focus to receive a dosage of radiation for curing.

The sensor assembly as provided above may be mounted directly on the inerting tube of the apparatus on an exterior side of the chamber wall. The inerting tube extends through the chamber to the exterior side. The sensor assembly may be mounted to the inerting tube so that a line-of-sight of the sensor element extends through the inerting tube at an acute angle with the longitudinal axis and extends to the source of radiation.

The sensor assembly as provided above is another aspect of the invention. The passageway of the sensor assembly may further include a plenum chamber adjacent the sensor element having a cross-sectional area greater than the cross-sectional area of the passageway. The plenum chamber is located proximately to the sensor element to reduce the gas flow velocity adjacent the sensor element, thereby providing a high pressure region directly in front of the sensor element.

The plenum chamber of the sensor assembly may be aerodynamically designed to promote laminar flow through the passageway when the shutter is in the open position. By encouraging laminar flow, flow separation at the housing is prevented. Flow separation causes flow reversion which may result in contamination flowing into the passageway of the sensor assembly. The aerodynamically designed plenum chamber thereby further protects the components within the sensor from contamination.

The gas source may include a controller for controlling the flow of gas from the gas source into the passageway of the sensor assembly. The controller controls the flow of gas so that the passageway has a first positive pressure when said shutter is in the closed position and a second positive pressure when the shutter is in the open position. By controlling the gas flow into the passageway, the passageway has a positive pressure when the shutter is in both the open and closed positions.

At least one gas inlet is provided on the sensor assembly housing. Two gas inlets may also be provided to reduce flow velocity and provide a more laminar flow within the passageway. A first inlet has a first stream of gas with a first direction and a second inlet has a second stream of gas with a second direction opposite to the first direction. The second velocity is substantially equal in magnitude, but opposite in direction to, the first velocity of the first stream of gas so that the first and second velocities are substantially reduced.

A lens may be mounted on the housing adjacent the open end of the passageway to further protect the sensor assembly from contamination by positively blocking the flow of contamination into the sensor passageway. The gas from the passageway may be ported to a region directly adjacent the lens so as to prevent contamination of the lens. Gas channels may be provided in the housing adjacent the lens so that the gas may be ported to the lens.

The sensor assembly may be provided with a first front passageway disposed transversely to a second front passageway. The first front passageway extends from the open end of the passageway to the second front passageway. The second front passageway extends to the plenum chamber. An angled surface of the housing extends from the first front passageway to the second front passageway and has a reflector disposed on the angled surface. The reflector thereby reflects the radiation entering the first front passageway around the bend in the passageway to the second front passageway so that the radiation will reach the sensor element. The reflector may comprise a dichroic reflector which reflects ultraviolet radiation and allows other radiation to pass through the reflector and out of the housing, where the radiation is ultraviolet radiation. By allowing radiation in an unwanted spectrum range to pass out of the housing, the sensor assembly heats up less, which extends the operating life of the sensor. To maintain a substantially equal flow rate across a cross-sectional area of the first and second front passageways, the passageways have a D-shaped cross-section.

A nozzle may be provided on the housing of the sensor assembly in alignment with the open end of the passageway. The nozzle has a cross-sectional area smaller than the cross-sectional area of the passageway, which maintains the positive pressure within the passageway. The nozzle may have a tapered exterior wall so that flow separation occurs as the gas exits the nozzle.

Another aspect of the invention is a mounting apparatus for mounting the sensor assembly on an inerting tube of an apparatus for curing a polymeric material, the inerting tube having a longitudinal axis and the sensor assembly having a line-of-sight. The mounting apparatus comprises a clamp defining a hole sized for receiving an inerting tube. The inerting tube extends through the hole and the clamp includes an angled surface for affixing the sensor assembly to the clamp so that the line-of-sight of the sensor element has an acute angle with respect to the longitudinal axis of the inerting tube. The clamp may be mounted at an exterior side of the apparatus. The vast majority of the components of the sensor assembly are not exposed to the adverse environment within the curing apparatus.

A method of sensing radiation in a curing apparatus having a radiation source is another aspect of the invention. The method comprises the steps of providing a sensor assembly having a passageway and a sensor element in the passageway, selectively opening and closing the passageway so that when it is opened the sensor element is exposed to radiation, and when it is closed the sensor element is not exposed to the radiation, and providing gas to the passageway of the sensor assembly such that a positive pressure is maintained when the passageway is opened or closed. The further steps of supplying a first slow of gas to the passageway of the sensor assembly when the shutter is in the closed position and supplying a second flow of gas to the passageway when the shutter is open to provide the positive pressure in the passageway may be performed. The further steps of supplying a first stream of gas in a first direction and second steam of gas in a second direction opposite to the first are preferred to reduce the velocity of the gas.

BRIEF DESCRIPTION OF THE DRAWINGS

These and other features, aspects and advantages of the present invention will become better understood with regard to the following description, appended claims and accompanying drawings, where:

DETAILED DESCRIPTION OF THE PREFERRED EMBODIMENTS

The invention will first be described in detail with respect to an ultraviolet curing chamber for curing optical fiber, or other fiber or filament-type products. However, it will be understood that the invention may be used in any ultraviolet curing chamber and is useful wherever sensing of radiation in a system for curing polymeric materials occurs in an adverse environment.

Figure 1:
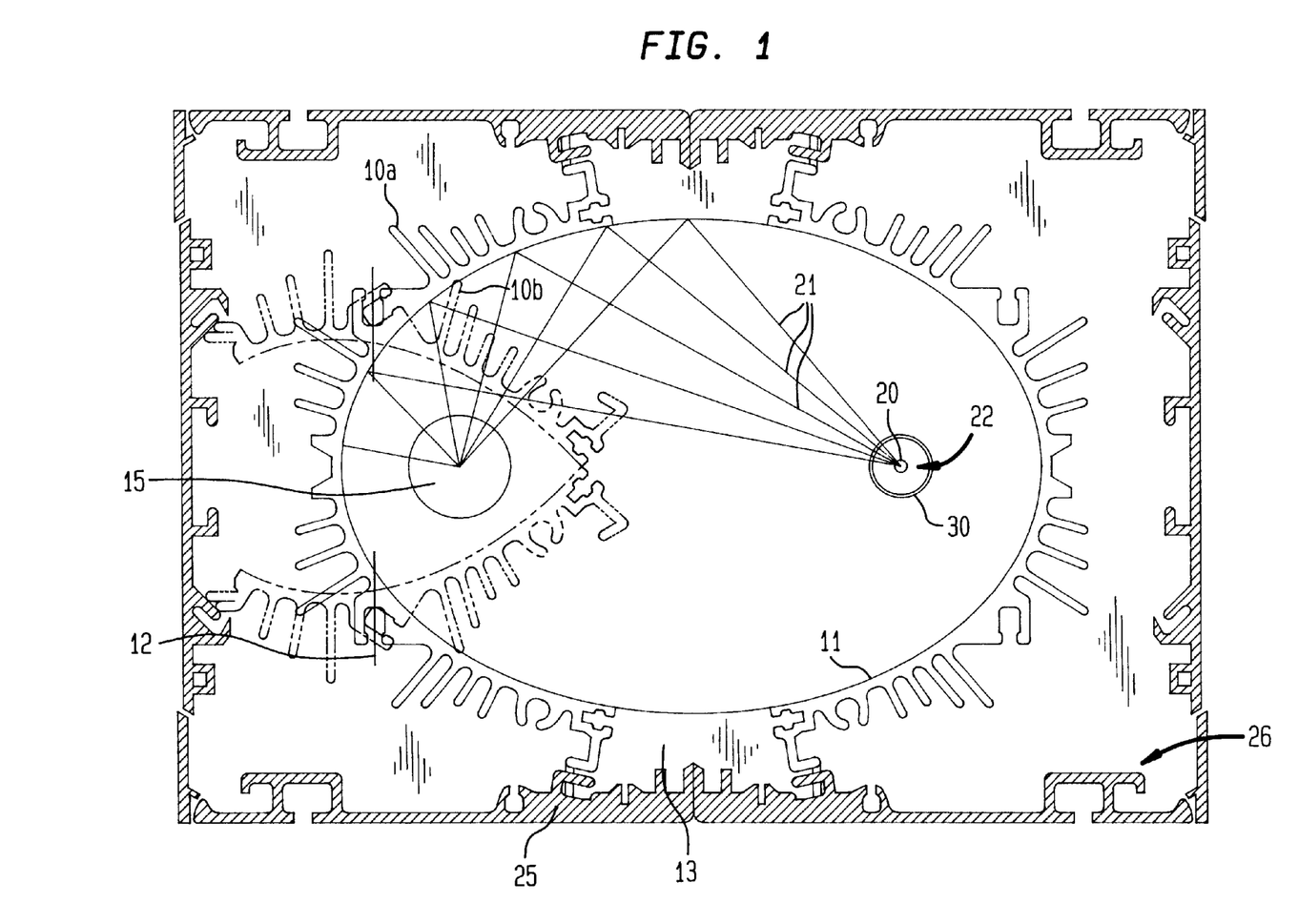
FIG. 1 is a plan view of a known reflector assembly and a UV curing chamber for curing a fiber.

A typical reflector housing for the UV curing of optical fibers or other filament-type products, as shown in plan in FIG. 1, has a reflector 11 contained within a chamber 26. The reflector 11 has an elliptical shape and is comprised of reflector segments 10, such as segment 10A. As show in FIG. 1, the reflector segment may be pivoted about pivot 12 to a shuttered position 10*b* to block the radiation from the remainder of the chamber during process shutdown, etc. A radiation source, such as a UV lamp 15, is located at one focus of the elliptical reflector to provide the radiation for curing the fiber 20.

A quartz inerting tube 30, located at the other focus of the reflector 11, is typically used to enclose the fiber or filament 20 in an inert atmosphere such as nitrogen. As the fiber passes through the inerting tube 30, the reflector 11 reflects radiation in paths 21 to reach even the side 22 of the fiber which is facing away from the source of radiation 15.

In general, a sensor assembly may be mounted in any position providing line-of-sight access to a portion of the reflector or the lamp. Most preferably, the sensor assembly 50 is mounted outside the chamber wall 25. In this location, the radiation energy and contamination to which the sensor assembly is subjected is dramatically reduced, as compared to mounting the sensor assembly within the curing chamber. In addition, the sensor assembly mounted outside the chamber is in a position where it may be conveniently installed and maintained.

Figure 2:
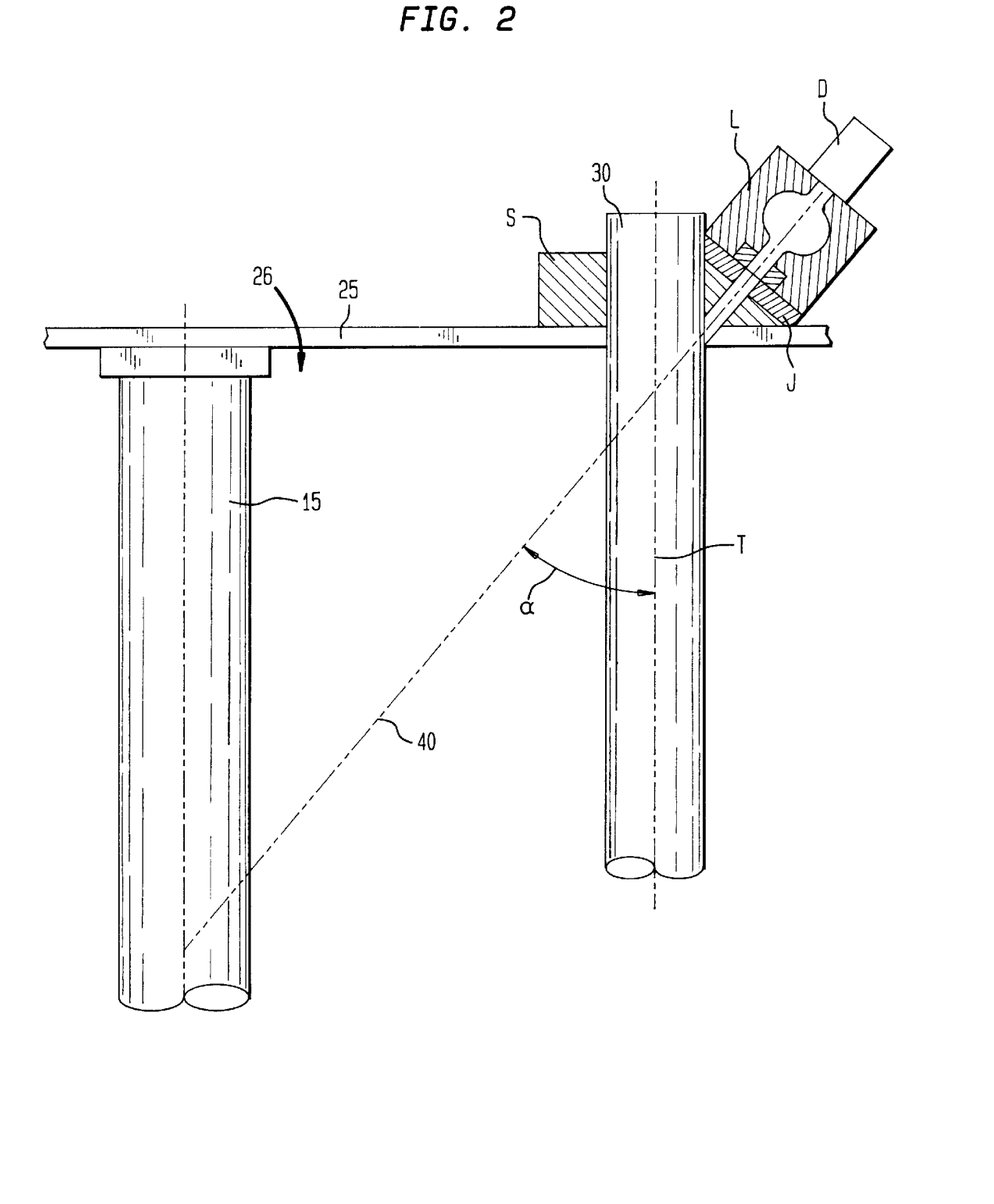
FIG. 2 is a diagrammatic partial sectional view of a UV reflector assembly and UV sensor assembly for an apparatus for curing a polymeric material according to one embodiment of the invention.

In an embodiment for use in curing fiber in a UV chamber 26 like that illustrated in FIG. 1, the sensor assembly 50 is mounted directly to the quartz tube 30 surrounding the filament 20 in a region where the tube protrudes from the chamber wall 25 as shown in FIG. 2. The sensor assembly 50 includes sensor element D for sensing the radiation emitted by source of radiation 15. The sensor element D has a line-of-sight 40 which extends through the quartz inerting tube 30 to the source of radiation 15. The sensor element D is mounted to the quartz inerting tube 30 so that the line-of-sight 40 has an acute angle also referred to as a skew angle α with a longitudinal axis T of the tube 30.

Figure 3:
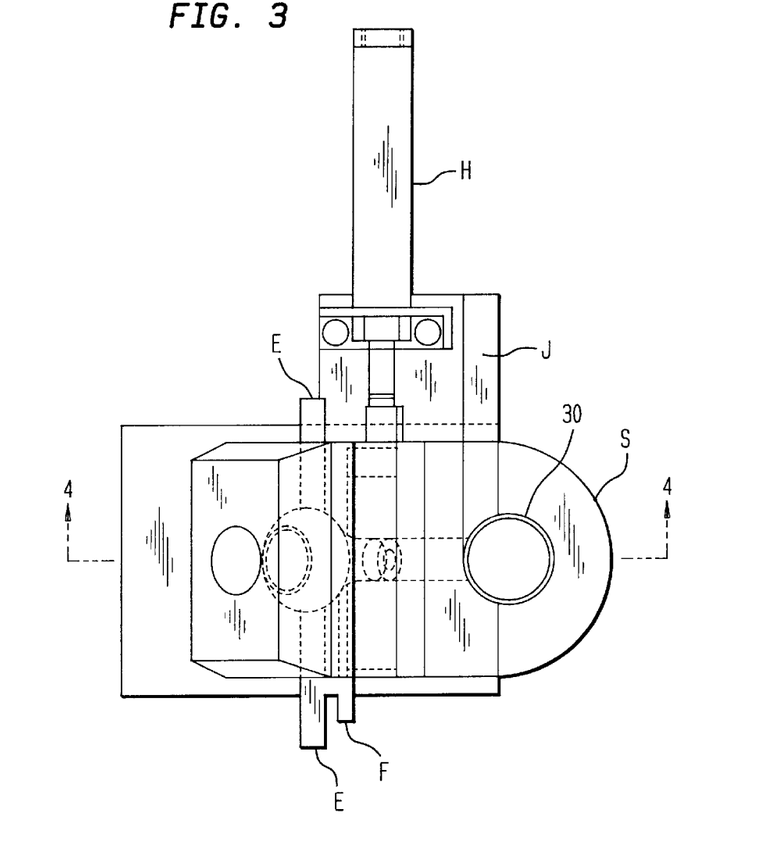
FIG. 3 is a top plan view of the embodiment of the sensor assembly of FIG. 2.
Figure 4:
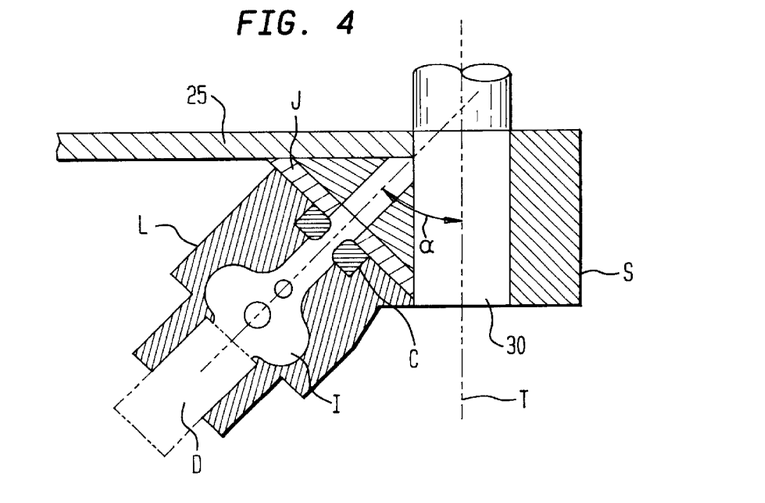
FIG. 4 is a sectional view of the sensor assembly taken through line 4—4 in FIG. 3.

In FIGS. 2–4, a mounting device comprising an inerting tube clamp S is affixed directly to a base plate J of the sensor assembly. The inerting tube clamp S attaches directly to the quartz inerting tube 30 outside the wall 25 of the UV chamber 26. The inerting tube clamp S may be formed of a plastic resin such as Teflon® or Nylon®, and may comprise a block having a through hole sized for a slight press fit over the quartz inerting tube 30. The inerting tube clamp S has an angled surface for mounting the sensor assembly at the skew angle α with respect to the axis T of the inerting tube. In the example shown, the sensor assembly is arranged so that the line-of-sight 40 of the sensor D is approximately 45° to the axis T of the inerting tube 30. In some systems, the angle may be 30°. Alternatively, the inerting tube clamp S may comprise a two-piece collar (not shown) for clamping around the inerting tube using clamping screws (not shown).

The inerting tube 30 must extend outside the wall 25 of the UV curing chamber housing approximately 1.5 inches (about 3.81 cm) in the preferred embodiment to permit attachment of the sensor housing clamp S.

Because quartz inerting tubes are substantially standardized in diameter, the sensor assembly of this embodiment may be mounted on a wide variety of UV chambers without further modification. For example, no mounting holes or special brackets are required. Furthermore, no additional openings need be formed in the UV chamber for access by the sensor.

This arrangement is preferred because it places all of the components of the sensor assembly outside the UV chamber. The positioning of the sensor takes advantage of the opening in the chamber wall 25 already provided for the inerting tube 30. The sensor receives radiation transmitted through the transparent inerting tube, and through the opening in the wall 25 provided for the inerting tube. Contamination of the sensor and sensor housing is thereby minimized.

Because the sensor assembly is mounted on the cylindrical outer diameter of the inerting tube 30, the sensor and housing may be rotated with respect to the inerting tube, permitting the measurement of radiation through a 360° arc with respect to the filament being cured.

The sensor assembly may also be mounted so as to be indexable between a first position (not shown) for measuring radiation directly from the UV tube, and a second position for measuring radiation from the reflector. Such a configuration is especially suited for optical fiber curing operations, where access is available for manually indexing the sensor between positions. The sensor may also be aligned to directly measure radiation from the UV lamp 15. Thus, localized contamination of the reflector or the inerting tube may be detected by comparing readings from different positions of the sensor assembly.

Figure 5:
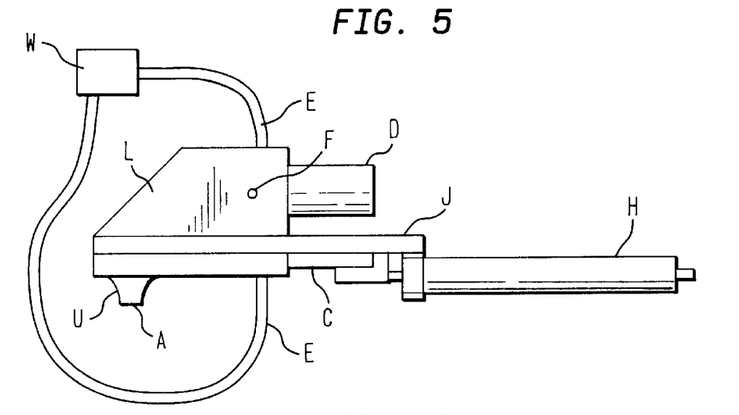
FIG. 5 is a schematic side elevational view of a sensor assembly according to the embodiment of FIGS. 2–4.
Figure 6:
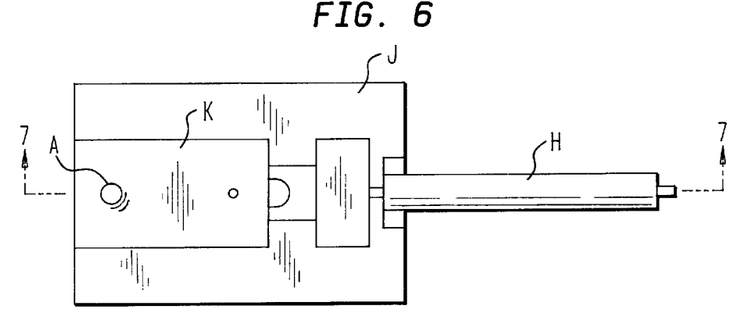
FIG. 6 is a schematic top plan view of the sensor assembly of the embodiment of FIGS. 2–5.
Figure 7:
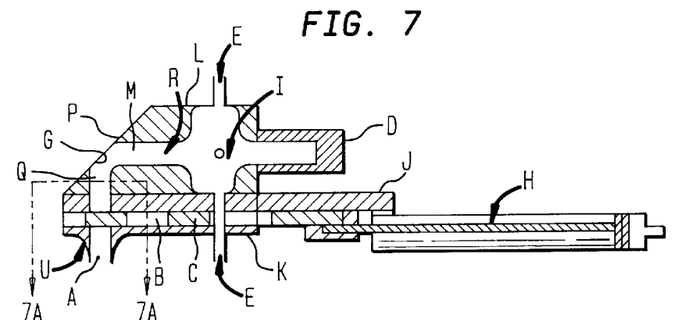
FIG. 7 is a schematic sectional view of the sensor assembly taken through line 7—7 in FIG. 6.

The sensor assembly of the apparatus comprises a base plate J (FIGS. 5–7) on which are mounted various components of the sensor assembly. The base plate J, together with all the major components of the sensor housing, are fabricated from a substantially inert, thermally stable, thermally insulating material such as DuPont Teflon® polytetrafluoroethylene (PTFE) resin. Radiation enters the sensor assembly through nozzle A in an aperture slide retaining plate K. An aperture slide C, which functions as a shutter, has an aperture B slidably mounted within the aperture slide retaining plate K. The shutter or slide C has an open position in which aperture B is aligned with nozzle A. When the aperture B is aligned with the nozzle A, UV radiation is permitted to pass through a hole provided in the base plate J into a passageway M in a chamber housing L. When the aperture slide C is in a closed position, the aperture B is blocked by the base plate J, as shown in FIG. 7. In the closed position, radiation is prevented from entering passageway M.

The passageway M, in this embodiment, includes a first front passageway Q disposed transversely to a second front passageway R to create a bend in the passageway M. An angled surface P extends from the first front passageway Q to second front passageway R, on which a dichroic reflector or mirror G is mounted. The UV radiation is reflected by a dichroic mirror G mounted on the angled surface P of the chamber housing L. The reflected UV radiation continues through the passageway M in the chamber housing L to a plenum chamber I. The radiation passes through the plenum chamber and strikes the sensor element D, where its intensity is measured.

The dichroic mirror G permits infrared and other wavelengths of radiation to pass through it, and reflects only the UV radiation. Thus, heating of the sensor is reduced, permitting more accurate measurement of the UV radiation intensity.

As an alternative to the dichroic mirror G, a more standard reflector such as a Coilzak® aluminum reflector, marketed by Alcoa Corp., may be used. That reflector is protectively coated using a special anodizing process. Because such a reflector reflects infrared, as well as UV radiation, it is desirable to filter the radiation before it reaches the sensor. Further, the infrared radiation reaching the interior of the sensor housing may cause thermal drift of the sensor.

The aperture slide C is shuttled between its closed position (FIG. 7) and its open position (not shown) by a pneumatic cylinder H. In a preferred embodiment, the aperture is returned to a closed position by a spring mechanism (not shown). In a preferred embodiment, the spring is internal to the pneumatic cylinder.

The sensor assembly of the present invention substantially prevents contamination of the sensor element D by providing at all times a positive pressure differential between the interior of the sensor housing and the UV curing chamber. The inventor has found that, in order to be effective, positive purge pressure must exist throughout the sensor assembly; i.e., there must be substantially no regions of low pressure within housing in which gasses or other materials from the curing chamber may become entrapped. In addition to substantially preventing contaminants from entering the housing, the purge gas provides a conductive cooling medium to reduce heating of the sensor and housing by incoming radiation and hot outside gases.

The pressurized purge gas is introduced from a gas source W through gas source inlets E into a plenum chamber I formed in the housing L of the sensor assembly 50. The plenum chamber I is a region of enlarged volume having smooth corners with generous radii in order to promote laminar flow within the chamber. The transition region between the plenum chamber and the smaller passageway leading to the sensor element D is a gradual transition in order to minimize flow separation at the walls of the chamber. The same is true for the transition from the plenum chamber to the passageway M leading to the aperture B.

Pressurized gas is introduced into the plenum chamber from two opposing inlets E. By placing the inlets in opposition, the inlet gas is quickly decelerated by the interaction of streams having equal but opposite velocity. The relatively large size of the plenum chamber I in comparison to the cross-section of the inlets E causes further deceleration of the gases in the chamber.

In a preferred embodiment of the invention, nitrogen is used as a purge gas in the sensor housing. Nitrogen is available in a UV curing process in those instances where it is used as the atmosphere under which UV curing takes place. If nitrogen is not available, clean air or another gas free of particulate or gaseous contaminants may be used. Most preferably, the gas source W is a commercially available, high-pressure vessel of substantially pure nitrogen.

Figure 7A:
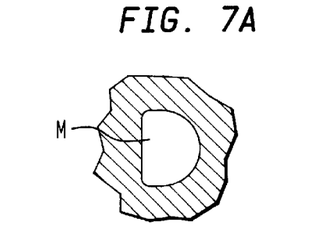
FIG. 7A is a section taken along line 7A–7B in FIG. 7.

After deceleration within the plenum chamber, the purging gas moves through a gradual transition into the passageway M. The passageway is constructed with generous radii at all corners in order to promote laminar flow and to avoid flow separation from the walls. In the region where the passageway angles due to reflection of the radiation by the dichroic mirror, the cross-section of the passageway may be configured to take into consideration differences in flow velocity between the outside and the inside of the corner. For example, a D-shaped cross-section (FIG. 7A) may be used, with the larger volume being placed toward the inside corner in order to maintain a constant flow rate across the cross-section of the passageway despite differences in velocity.

The aperture B in the aperture plate C functions as a nozzle with increased flow velocity in the vicinity of the aperture. The aperture walls are radiused for gradual change in cross-sectional size, in order to minimize flow separation. The smaller cross-sectional area of the aperture B as compared with the passageway M maintains a positive pressure within the housing, thereby excluding contaminants from outside the housing.

The nozzle A protrudes from the aperture plate retaining plate K with a tapered exterior wall U having a convex radius surrounding the nozzle and forming a sharp corner at the opening to the UV curing chamber. That shape promotes immediate flow separation of the purging gas upon exit through the aperture, and minimizes the formation of eddies and other turbulence at the exit point of the flow.

Thus, substantial laminar flow is preserved throughout the flow path from the gas inlets E to the exit nozzle A. Low pressure regions caused by flow separation, turbulence or eddy formation are minimized, maximizing the purging effect of the gas flow through the sensor housing.

The sensor element D for sensing electromagnetic radiation may be a commercially available UV intensity monitor such as the DIN Rail Mount UV Intensity Monitor marketed by EIT Instrumentation Products of Sterling, Va. That sensor includes a protective quartz lens to prevent damage to the photodiode element within the sensor.

The quartz lens may be sputtered with a metallic coating to act as a band-pass filter, allowing only UV radiation to enter the sensor.

Alternatively, other UV sensors, or sensors for measuring other parameters, may be used in place of the above UV sensor; for example, the sensor housing may house sensors for measuring infrared radiation, visible light, microwaves, video images, audio waves, gas analysis or gas presence such as oxygen sensing.

In the embodiment of FIGS. 2–7, the positive pressure within the passageway M of the sensor assembly 50 prevents the entry of contamination into the passageway. In addition, the inerting tube 30 at least partially seals the chamber M from outside contamination.

The chamber I of the sensor assembly is pressurized through inlets E, and the pressure is regulated with a pressure regulator F. To maintain 2 PSI purge pressure within the sensor housing of the invention while the aperture is closed, a low flow rate of purge gas, such as 1 cu. ft. per hour, is applied at the inlets E. The gas is permitted to escape through natural leaks in the system, as well as through a pressure regulator F. The regulator maintains positive pressure within the sensor assembly.

However, in another embodiment, the sensor assembly is mounted at another location in a curing apparatus where the passageway M is exposed to the chamber 25 directly when the shutter or slide C opens to admit radiation into the assembly.

Figure 8:
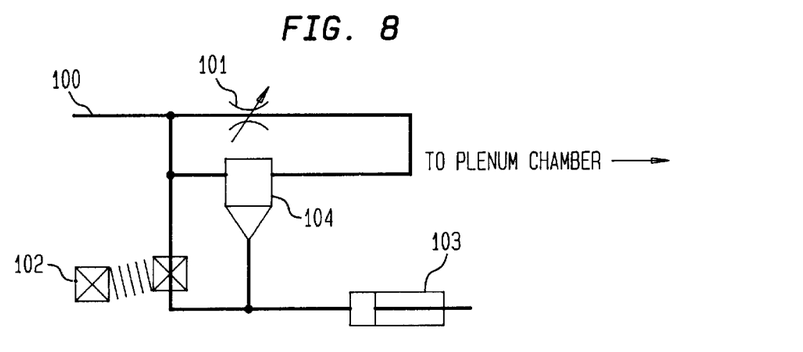
FIG. 8 is a schematic diagram of a pneumatic control system for a sensor assembly, according to another embodiment of the invention.

A controller comprising a pneumatic system for opening the shutter and maintaining purge pressure in the sensor housing of the invention is shown schematically in FIG. 8. As noted, nitrogen may be used for purging the sensor housing. Nitrogen may further be used for actuation of the pneumatic cylinder used in opening the sensor aperture. Alternatively, clean air may be used for this purpose.

In a standby mode, a line pressure 100 of approximately 70–100 PSI is regulated by variable orifice valve 101, which provides a flow rate of approximately 1 cu ft. per hour of purging gas to the plenum chamber, as noted above. Because the aperture is closed, only a low flow rate is necessary to maintain a standby pressure of typically 2 PSI.

To prepare the sensor housing for measurement, the read-enable valve 102 is actuated either by push-button or by emote control. The open valve 102 permits line pressure 100 to flow to the shutter actuator 103, which is, in the preferred embodiment, a pneumatic cylinder. Actuation of the valve 102 also permits line pressure to reach the pilot-operated valve 104, which opens and allows the flow of purging gas at full volume to reach the plenum chamber. In this way, a positive pressure differential of approximately ½ PSI is be maintained in the plenum chamber and passageways while the aperture is open. After providing sufficient time for the aperture to open and for the sensor to settle, data collection from the sensor begins. Sensors such as the UV sensor used in the preferred embodiment of the invention typically have a settling time of approximately from two to five seconds. The data may be acquired using a data acquisition board, which may then transfer the data for processing to a personal computer. The computer may be running Visual Basic or another program for processing data. The data is processed and displayed or stored for later analysis.

Figure 9:
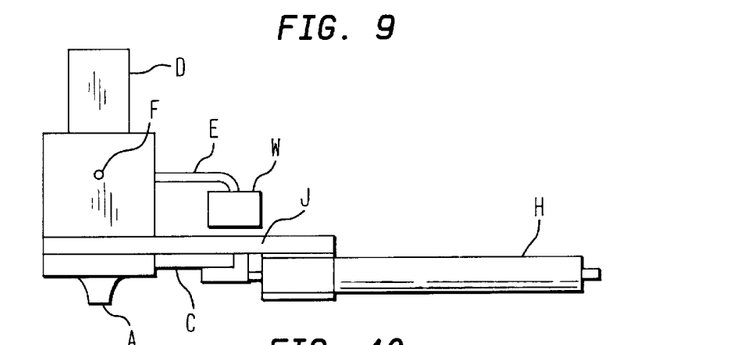
FIG. 9 is a schematic side elevational view of another embodiment of the sensor assembly of the invention.
Figure 10:
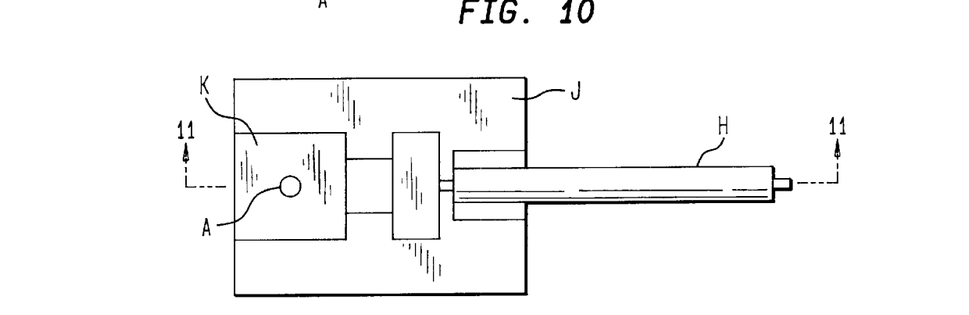
FIG. 10 is a schematic top plan view of the sensor assembly according to the embodiment of FIG. 9.
Figure 11:
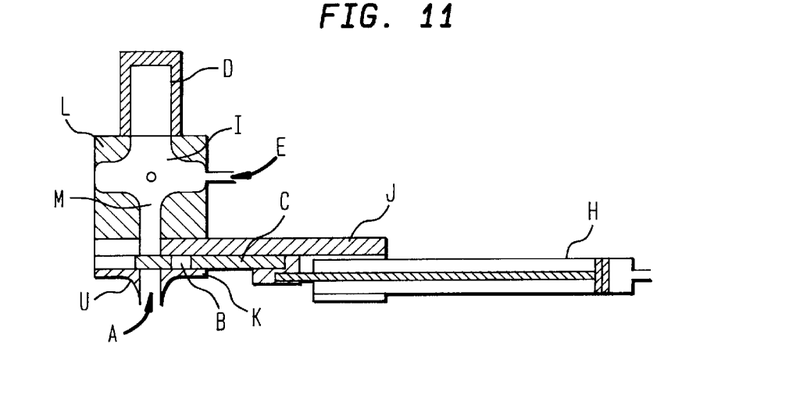
FIG. 11 is a schematic sectional view of the sensor assembly taken through line 11—11 in FIG. 10.

In another embodiment of the invention, shown in FIGS. 9–11, no dichroic reflector is used within the housing, and the sensor is aligned directly with the aperture B and nozzle A. Because there is no bend in the gas pathway between the plenum chamber I and the nozzle A, the likelihood of flow separation between the purged gas and the chamber walls is further reduced. This configuration, however, may be used only where a dichroic mirror is not necessary to reduce radiation outside the UV range before the radiation is measured by the sensor. Furthermore, the embodiment shown in FIGS. 9–11 has a greater overall height because the sensor and chamber passageway are perpendicular to the base plate J. The arrangement may therefore be used only where sufficient clearance is available for the sensor and the chamber.

Figure 12:
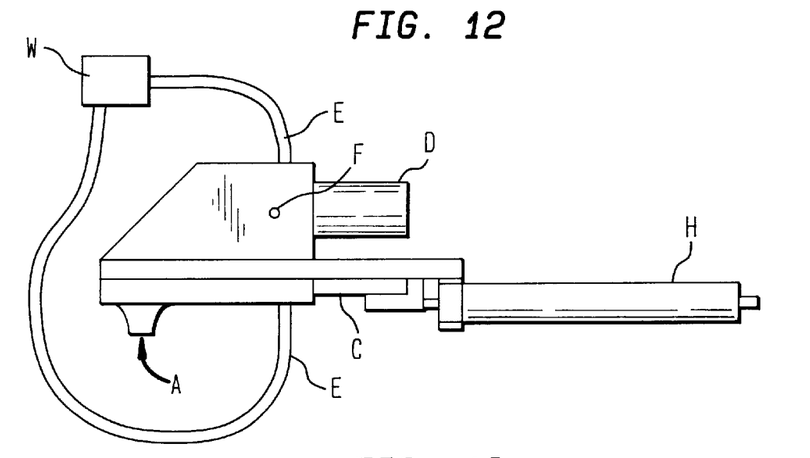
FIG. 12 is a schematic side elevational view of another embodiment of the sensor assembly of the invention.
Figure 13:
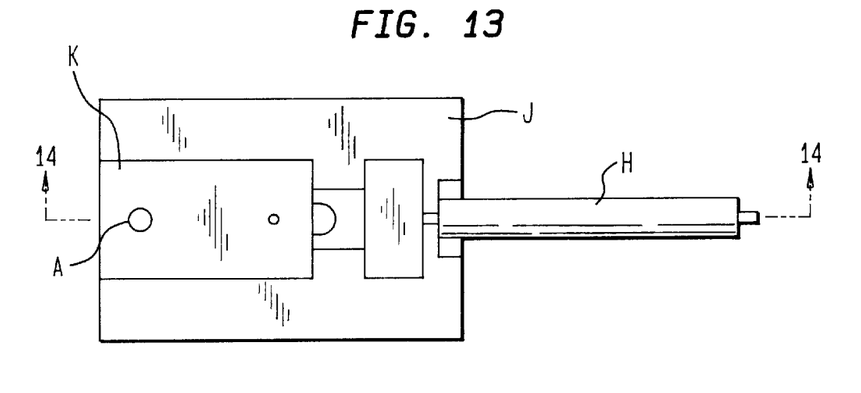
FIG. 13 is a schematic top plan view of the sensor assembly of FIG. 12.

In another embodiment of the invention, shown in FIGS. 12–13, a quartz lens O is placed in the flowpath on the sensor element side of the aperture B in the shutter C. The quartz lens O may be coated to selectively eliminate radiation outside the measured range; i.e., the lens may be a band-pass filter. The lens provides a positive blockage of outgassed and particulate materials that may otherwise contaminate the sensor element D.

Figure 14:
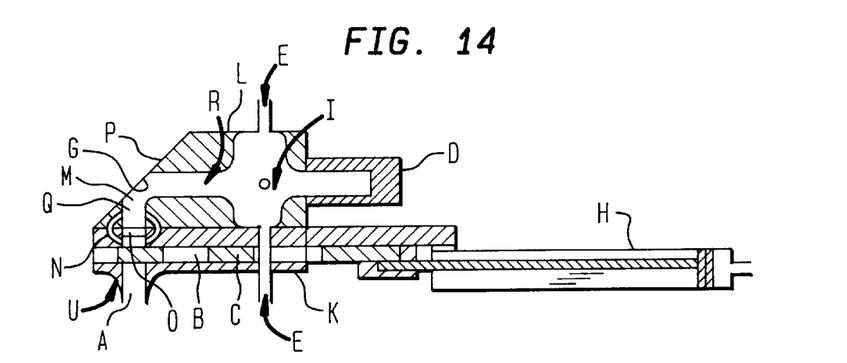
FIG. 14 is a schematic sectional view of the sensor assembly taken through line 14—14 in FIG. 13.

Purged gas channels N are formed in the base plate J and housing L for maintaining pressure on both sides of the lens, thereby discouraging outside contamination. A shutter C is still used to protect the lens between readings. The lens is thus kept clear of contaminants on both sides by the shutter and by positive pressure differential.

When the shutter C opens, the escape of purged gas does not increase to the extent described in other embodiments having an open flowpath (rather than a lens O), because the gas may escape only through the by-pass channels N and not through the sensing aperture. Thus, there is no need to increase the purge flow rate when the shutter is open.

Figure 15:
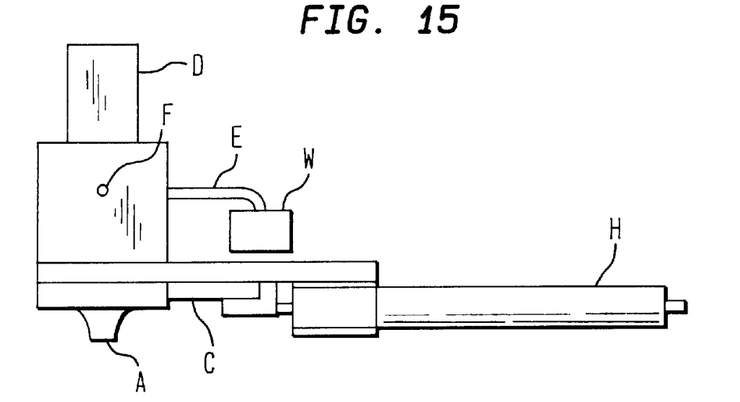
FIG. 15 is a schematic side elevational view of yet another embodiment of the sensor assembly of the invention.
Figure 16:
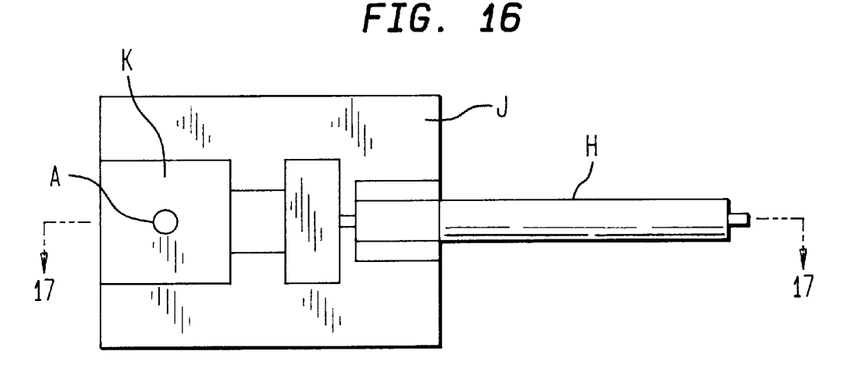
FIG. 16 is a schematic top plan view of the sensor assembly of FIG. 15.
Figure 17:
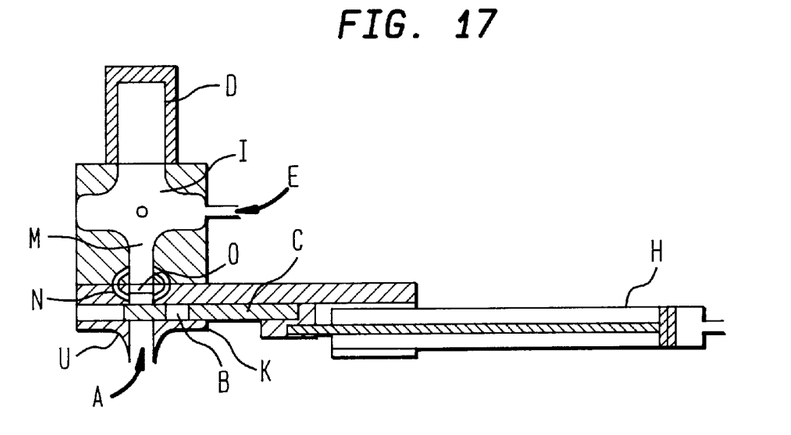
FIG. 17 is a schematic sectional view of the sensor assembly taken through line 17—17 of FIG. 16.

The quartz lens O and by-pass purge channels N may also be incorporated in an upright configuration, as shown in the embodiments of FIGS. 15–17.

The embodiments disclosed herein permit taking measurements during normal operation of the UV curing chamber. Thus, in an optical fiber curing chamber, continuous filament curing operation needs not be shut down to measure the condition of the UV curing elements. Further, the sensor may be arranged to take measurements at one or more consistent, repeatable locations within the UV curing chamber. For example, the sensor may be locked in a single angular position on the inerting tube, such as facing the UV lamp, as shown in FIG. 2. Alternatively, rotatable stops or other fiducials (not shown) may be provided for moving the sensor housing to two or more predetermined, repeatable angular positions for taking measurements at a plurality of predetermined points on the reflector. Measurements are taken through the inerting tube, so that deposits on that component may be detected.

Figure 18:
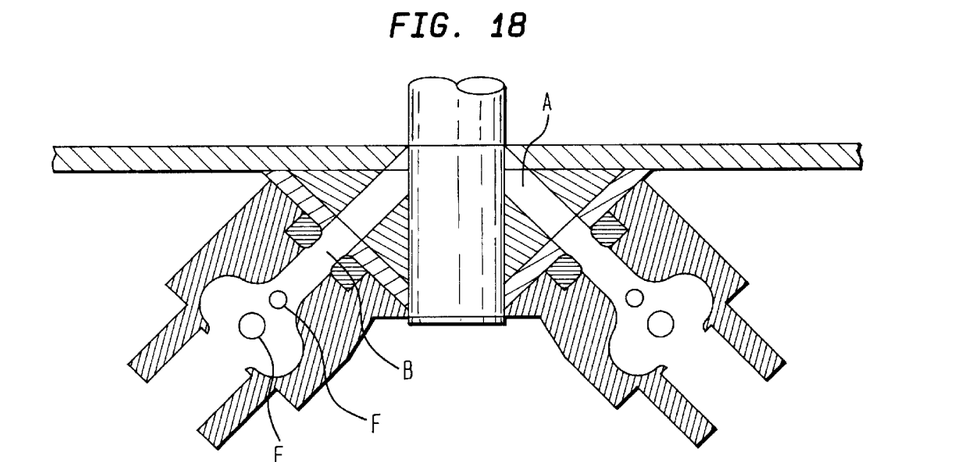
FIG. 18 is a sectional view of a multi-sensor embodiment in accordance with the invention.

The inerting tube-mounted embodiment of the sensor housing shown in FIGS. 2–4 may incorporate a plurality of sensor housings arranged radially around the inerting tube. For example, as shown in FIG. 18, two sensor housings may be arranged at diametrically opposite positions on the inerting tube. In other embodiments, three or four sensor housings may be arranged around the inerting tube, providing readings from various angles without the necessity of rotating the sensor housing about the inerting tube.

Figure 19:
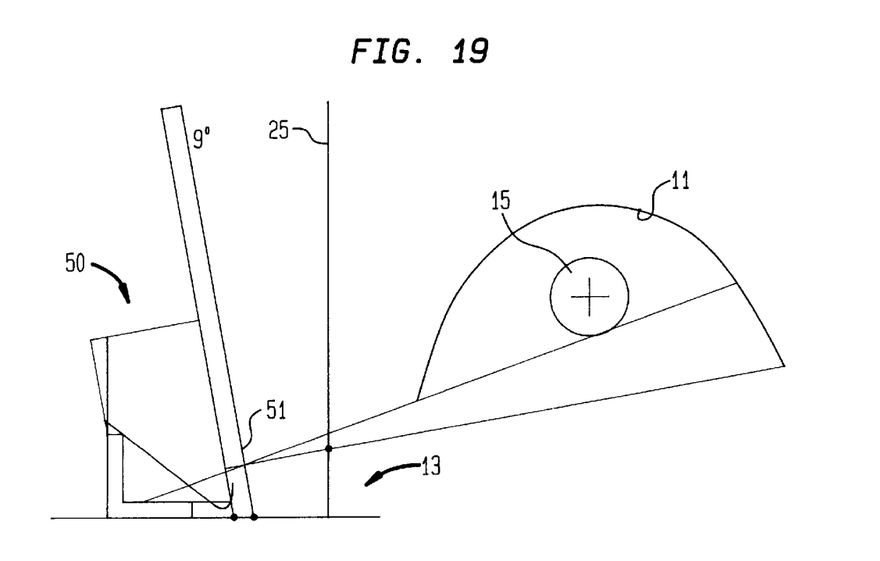
FIG. 19 is a schematic view of a sensor assembly in accordance with another embodiment of the invention showing its spatial relationship to a reflector housing.

In another embodiment of the invention, the opening 13 (FIG. 1) between panels 10 is utilized for providing access for the sensor. The sensor assembly 50 (FIG. 19) of the present invention may be mounted outside the chamber wall 25 of the curing chamber. The sensor is inclined slightly with respect to the cabinet 25; in the example shown in FIG. 19, the sensor is inclined 9° with respect to the cabinet. Light from the UV lamp 15 is reflected by the reflector surface 11 and enters the aperture 51 in the sensor assembly 50.

By measuring radiation reflected from the reflector wall, as opposed to measuring radiation directly from the UV lamp, measurements taken by the sensor of the present invention are affected both by degradation of the lamp itself and by outgassing deposition on the reflector surface. Because both parameters affect the UV radiation available for curing, this arrangement provides additional information needed for effective process control.

Numerous variations and combinations of the features discussed above may be utilized without departing from the present invention. For example, the device may be rail-mounted above a sheet-curing line typically used for curing flooring and the like. In another example, the device may be used for housing a chemical sensor such as an oxygen sensor. In that case, after the aperture is opened, the oxygen sensor is indexed through the aperture into the environment to be measured. Purged gas would be deflected or reduced in order to assure that the sensor is exposed to the ambient atmosphere. Between readings, the housing would be purged and pressurized as described above. Similarly, in the case of acoustical measurement, the sensor may be indexed through the aperture to sense sound waves in the ambient atmosphere. As these are other variations and other combinations of the features discussed above are utilized, the foregoing description of the preferred embodiment should be taken by way of illustration rather than by limitation of the invention.

I claim:

1. An apparatus for curing a polymeric material, comprising:

a chamber wall defining a chamber;

a source of radiation for providing radiation mounted within said chamber for curing a polymeric material;

a reflector assembly mounted within said chamber for reflecting the radiation from said source to the material within said chamber; and a sensor assembly, having:

a housing including a passageway having at least one gas inlet and an open end through which radiation can enter;

a sensor element disposed in said passageway for sensing the radiation;

a shutter having an open position in which radiation can enter said passageway at said open end and a closed position in which said open end is blocked to prevent the radiation from entering said passageway; and a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing.

2. The apparatus of claim 1, wherein:

said reflector assembly has an elliptical shape in plan with a first focus and a second focus, said source of radiation being mounted within said chamber at said first focus; and said chamber includes an inerting tube at said second focus, said inerting tube having a longitudinal axis and defining a conduit for a fiber having a polymeric coating to be cured.

3. An apparatus for curing a polymeric material, comprising:

a) a chamber wall defining a chamber;
b) a source of radiation for providing radiation mounted within said chamber for curing a polymeric material;
c) a reflector assembly mounted within said chamber for reflecting the radiation from said source to the material within said chamber;
a sensor assembly, having:
i) a housing including a passageway having at least one gas inlet and an open end through which radiation can enter;
ii) a sensor element disposed in said passageway for sensing the radiation;
iv) a shutter having an open position in which radiation can enter said passageway at said open end and a closed position in which said open end is blocked to prevent the radiation from entering said passageway; and
v) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing;
d) said reflector assembly having an elliptical shape in plan with a first focus and a second focus, said source of radiation being mounted within said chamber at said first focus; and
e) said chamber including an inerting tube at said second focus, said inerting tube having a longitudinal axis and defining a conduit for a fiber having a polymeric coating to be cured; and
f) said sensor assembly being mounted directly on said inerting tube on an exterior side of said chamber wall.

4. The apparatus of claim 3, wherein:

said inerting tube extends through said chamber to said exterior side;

said sensor element having a line-of-sight and being mounted so that said line-of-sight extends through said inerting tube at an acute angle with said longitudinal axis and extends to said source of radiation.

5. The apparatus of claim 4, further comprising:

a clamp for mounting said sensor assembly, defining a hole sized for receiving said inerting tube, said inerting tube extending through said hole of said clamp, said clamp including an angled surface for affixing said sensor assembly to said clamp.

6. A sensor assembly for sensing radiation in an adverse environment, comprising:

a housing including a passageway having at least one gas inlet and an open end through which radiation can enter;

a sensor element disposed in said passageway for sensing the radiation;

a shutter having an open position in which radiation can enter said passageway at said open end and a closed position in which said open end is blocked to prevent the radiation from entering said passageway; and a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing.

7. The sensor assembly of claim 6, wherein:

said passageway includes a plenum chamber adjacent said sensor element having a cross-sectional area greater than a cross-sectional area of said passageway.

8. The sensor assembly of claim 7, wherein:

said plenum chamber is aerodynamically designed to promote laminar flow through said passageway and to prevent flow separation at said housing.

9. The sensor assembly of claim 7, further comprising:

a lens mounted on said housing adjacent said open end of said passageway to further protect said sensor assembly from the adverse environment.

10. The sensor assembly of claim 7, wherein:

said passageway includes a first front passageway extending from said open end to a second front passageway, said second front passageway extending to said plenum chamber, said first front passageway being disposed transversely to said second front passageway.

11. The sensor assembly of claim 10 wherein:

said first and second front passageways have a cross-sectional area and a D-shaped cross section for maintaining a substantially equal flow rate across said cross-sectional area of said first and second front passageways.

12. A sensor assembly for sensing radiation in an adverse environment, comprising:

a) a housing including a passageway having at least one gas inlet and an open end through which radiation can enter;
b) a sensor element disposed in said passageway for sensing the radiation;
c) a shutter having an open position in which radiation can enter said passageway at said open end and a closed position in which said open end is blocked to prevent the radiation from entering said passageway; and
d) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing;
e) said passageway including a plenum chamber adjacent said sensor element having a cross-sectional area greater than a cross-sectional area of said passageway,
f) said plenum chamber being aerodynamically designed to promote laminar flow through said passageway and to prevent flow separation at said housing, and said gas source including a controller for controlling the flow of gas from said gas source so that said passageway has a first positive pressure when said shutter is in said closed position and a second positive pressure when said shutter is in said open position.

13. A sensor assembly for sensing radiation in an adverse environment, comprising:

a) a housing including a passageway having at least one gas inlet and an open end through which radiation can enter;
b) a sensor element disposed in said passageway for sensing the radiation;
c) a shutter having an open position in which radiation can enter said passageway at said open end and a closed position in which said open end is blocked to prevent the radiation from entering said passageway; and
d) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing,
e) said passageway including a plenum chamber adjacent said sensor element having a cross-sectional area greater than a cross-sectional area of said passageway, and
f) said at least one gas inlet comprising a first inlet having a first stream of gas with a first direction and a second inlet having a second stream of gas with a second direction opposite to said first direction.

14. The sensor assembly of claim 13, wherein:
said gas is ported from said passageway to a region directly adjacent an exterior surface of said lens so as to prevent contamination of said lens.

15. The sensor assembly of claim 14, wherein:
said housing further defines gas channels adjacent said lens.

16. A sensor assembly for sensing radiation in an adverse environment, comprising:
a) a housing including a passageway having at least one gas inlet and an open end through which radiation can enter;
b) a sensor element disposed in said passageway for sensing the radiation;
c) a shutter having an open position in which radiation can enter said passageway at said open end and a closed position in which said open end is blocked to prevent the radiation from entering said passageway; and
d) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing,
e) said passageway including a plenum chamber adjacent said sensor element having a cross-sectional area greater than a cross-sectional area of said passageway,
f) said passageway including a first front passageway extending from said open end to a second front passageway, said second front passageway extending to said plenum chamber, said first front passageway being disposed transversely to said second front passageway,
g) an angled surface on said housing extending from said first front passageway to said second front passageway; and
h) a reflector mounted on said angled surface for reflecting radiation to said sensor element.

17. The sensor assembly of claim 16, wherein:
said sensor element comprises an ultraviolet radiation sensor for sensing ultraviolet radiation; and said reflector is a dichroic reflector for reflecting the ultraviolet radiation and for allowing radiation other than the ultraviolet radiation to pass through said dichroic reflector and exit said housing.

18. A sensor assembly for sensing radiation in an adverse environment, comprising:
a) a housing including a passageway having at least one gas inlet and an open end through which radiation can enter;
b) a sensor element disposed in said passageway for sensing the radiation;
c) a shutter having an open position in which radiation can enter said passageway at said open end and a closed position in which said open end is blocked to prevent the radiation from entering said passageway; and
d) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing,
e) said passageway including a plenum chamber adjacent said sensor element having a cross-sectional area greater than a cross-sectional area of said passageway,
a nozzle on said housing in alignment with said open end of said passageway, said nozzle having a cross-sectional area smaller than said cross-sectional area of said passageway for maintaining a positive pressure within said passageway.

19. The sensor assembly of claim 18, wherein:
said nozzle has tapered exterior walls for increasing flow separation at said nozzle.

20. A sensor assembly for sensing radiation in an adverse environment, comprising:
a) a housing including a passageway having at least one gas inlet and an open end through which radiation can enter;
b) a sensor element disposed in said passageway for sensing the radiation;
c) a shutter having an open position in which radiation can enter said passageway at said open end and a closed position in which said open end is blocked to prevent the radiation from entering said passageway; and
d) a gas source in communication with said at least one gas source inlet for supplying gas to said passageway whereby said passageway has a positive pressure when said shutter is in its open position and when said shutter is in its closed position, said positive pressure being sufficient to substantially reduce the entry of contaminants from said chamber into said housing,
e) said passageway including a plenum chamber adjacent said sensor element having a cross-sectional area greater than a cross-sectional area of said passageway,
f) a clamp defining a hole sized for receiving an inerting tube of a curing apparatus, the inerting tube extending through said hole of said clamp;
g) said clamp including an angled surface so that the line-of-sight of said sensor element has an acute angle with respect to the longitudinal axis of the inerting tube.

21. A mounting device for mounting a sensor assembly on an inerting tube of an apparatus for curing a polymeric material, the inerting tube having a longitudinal axis and the sensor assembly having a sensor element with a line-of-sight, said mounting apparatus comprising:

a clamp defining a hole sized for receiving an inerting tube, the inerting tube extending through said hole of said clamp;

said clamp including an angled surface for affixing the sensor assembly to said clamp so that the line-of-sight of the sensor element has an acute angle with respect to the longitudinal axis of the inerting tube.

22. The mounting device of claim 21, wherein:

said clamp is mounted at an exterior side of the apparatus.

23. The method of sensing radiation in a curing apparatus having a radiation source, comprising the steps of:

providing a sensor assembly having a passageway and a sensor element in the passageway;

selectively opening and closing the passageway so that when it is opened the sensor element is exposed to the radiation, and when it is closed the sensor element is not exposed to the radiation; and providing gas to the passageway of the sensor assembly such that a positive pressure is maintained when the passageway is opened or closed.

24. The method of sensing radiation in a curing apparatus having a radiation source, comprising the steps of:

a) providing a sensor assembly having a passageway and a sensor element in the passageway;

b) selectively opening and closing the passageway so that when it is opened the sensor element is exposed to the radiation, and when it is closed the sensor element is not exposed to the radiation; and c) providing gas to the passageway of the sensor assembly such that a positive pressure is maintained when the passageway is opened or closed;

d) supplying a first flow of gas to the passageway of the sensor assembly when the shutter is in the closed position; and e) supplying a second flow of gas to the passageway when the shutter is in the open position.

25. The method of sensing radiation in a curing apparatus having a radiation source, comprising the steps of:

a) providing a sensor assembly having a passageway and a sensor element in the passageway;

b) selectively opening and closing the passageway so that when it is opened the sensor element is exposed to the radiation, and when it is closed the sensor element is not exposed to the radiation;

c) providing gas to the passageway of the sensor assembly such that a positive pressure is maintained when the passageway is opened or closed;

a) supplying a first stream of gas to the passageway of the sensor assembly in a first direction; and b) supplying a second stream of gas to the passageway in a second direction opposite to said first direction.

* * * * *